United States Patent [19]

Vermaat et al.

[11] Patent Number: 5,118,522

[45] Date of Patent: Jun. 2, 1992

[54] PRODUCT AND PROCESS OF MAKING A SPREAD FROM NON-EQUILIBRATED CREAM

[75] Inventors: Karel T. Vermaat, Rotterdam, Netherlands; Jean C. Martine, Eragny/Oise, France

[73] Assignee: Unilever Patent Holdings B.V., Rotterdam, Netherlands

[21] Appl. No.: 366,917

[22] Filed: Jun. 16, 1989

[30] Foreign Application Priority Data

Jun. 17, 1988 [GB] United Kingdom ............... 8814479
Jul. 14, 1988 [GB] United Kingdom ............... 8816752

[51] Int. Cl.⁵ .................... A23C 15/06; A23D 7/02
[52] U.S. Cl. ................... 426/581; 426/586; 426/603; 426/664
[58] Field of Search ............ 426/580, 581, 586, 603, 426/664

[56] References Cited

U.S. PATENT DOCUMENTS

| | | | |
|---|---|---|---|
| 2,605,185 | 7/1952 | Bjarne et al. | 99/119 |
| 4,425,370 | 1/1984 | Graves | 426/603 |
| 4,769,255 | 9/1988 | Ahmed et al. | 426/581 |
| 4,820,539 | 4/1989 | Lehmann et al. | 426/581 |
| 4,888,197 | 12/1989 | Wieske | 426/603 |

FOREIGN PATENT DOCUMENTS 0101104 2/1984 European Pat. Off. .
311634-D 11/1972 U.S.S.R. ............... 426/581

OTHER PUBLICATIONS

European Search Report re 89291572.8.
Wilson, "Techniques of Fractionation of Milk Fat", *The Australian Journal of Dairy Technology,*—Mar. 1975, pp. 10-13.

*Primary Examiner*—Donald E. Czaja
*Assistant Examiner*—Helen Pratt
*Attorney, Agent, or Firm*—Cushman, Darby & Cushman

[57] ABSTRACT

The present invention relates to a spread, to a process for preparing the spread, to a cream from which the spread can be prepared, and, to equipment for performing the abovementioned process. An object of the invention is to prepare spreads with an inhomogeneous structure and improve properties. The invention provides a process for the preparation of a spread by churning of a cream wherein the cream is formed by admixture of two creams at differing temperature shortly before churning, and does not equilibrate before churning begins.

8 Claims, 2 Drawing Sheets

PRODUCT AND PROCESS OF MAKING A SPREAD FROM NON-EQUILIBRATED CREAM

The present invention relates to a spread, to a process for preparing the spread, to a cream from which the spread can be prepared, and, to equipment for performing the abovementioned process. Generally the spread is a margarine-like butter, that is, a butter which is sufficiently soft when taken from cold storage to be spreadable. The invention also concerns a butter-like spread, that is, a spread which does not consist only of butterfat and butter serum but which has at least some of the organoleptic and mechanical properties of butter.

Many attempts have been made to prepare spreads with mechanical properties similar to butter. One favoured approach has been the use of churning technology related to that used in dairies rather than the scraped-surface heat exchanger technology prevalent in margarine manufacture. A plethora of patents have been filed on this subject.

It should be noted that for the purposes of this specification the term "churn" and references to "churning" are intended to embrace respectively all apparatus and methods using such apparatus in which a plastified edible fatty emulsion is formed under conditions in which buttermilk is expressed from the process stream. Examples of many types of churning process and apparatus are well known to the man skilled in the art.

Other than were the context demands otherwise the terms "oil" and "fat" are interchangeable. For convenience, reference to "margarine-fats" includes reference to non-dairy fats such as animal tallow, vegetable oils and fish oils whether unmodified or modified by ester-interchange, fractionation or hydrogenation.

During traditional butter churning partial phase separation occurs with loss of much of the aqueous phase as buttermilk and a concentration of the dairy fat phase in the butter mass. A vast body of literature is concerned with the process conditions and physical changes which subsist during the butter-churning process.

In the original margarine production process described by Mouries in GB 2157 (1869) rendered (fractionated) animal fat having the same melting point as dairy fat was dispersed in milk plasma, churned and the product treated with ice-cold water to cause the emulsion to solidify. The intermediate product was washed and worked to form a plastic spread. This process is essentially a dairy process in which the butterfat is replaced by a margarine-fat. As with conventional butter churning, a vast body of literature describes the churning of margarine. It should be noted that modern margarine production favours the so called "Votator" route to the product.

Following the acceptance of margarine as a product, other workers have attempted to make butter with the desirable spreadability of margarine. Not unexpectedly, this work has in part concerned itself with the application of margarine processing techniques to butter-making. The greater part of this work has concerned the use of margarine/butter-fat blends, and a lesser part with the addition of water to butter.

A large number of patents have related to the blending of dairy cream with liquid oils and subsequent churning of the blend. Representative of this class of patent is GB 1217395, which discloses in general terms the technical means by which the so-called "Breggot" products have been prepared. These products have enjoyed considerable commercial success.

EP 0106620 (UK Milk Marketing Board) discloses a process in which cream separated from cows milk is blended with soybean oil and hydrogenated soybean oil to produce a composition having the same solid fat content (the so-called "N-line") as butter, and thus to overcome seasonal variations in the chemical components of butter.

"N-lines" of fats measure the percentage of solid fat present at a particular temperature, whereas hardness of a spread is more often measured as the so-called "C-value", relating the ease or difficulty of penetration with a probe to temperature, either in millimeters or on the so-called "UMA" scale.

EP 0155246 (Svenska MR upa and ARLA) requires that the iodine value (the so-called "IV") of a spread fat must be equal to that of butter. The iodine value of a fat is related to its degree of saturation. In general, the higher the IV of a fat the lower the melting point and the lower the N-value at a particular temperature. Moreover, lower N-values can be associated with softer products, that is, with products having low C-values at a reference temperature.

Over many years, it has become apparent that the mechanical properties of butter are to some extent determined by the micro-structure of the product. Butter comprises a continuous crystallised fat phase in which a dispersed aqueous phase is present. An important structural feature of butter is the presence of surviving fat-globules from the cream, embedded in a continuous fatty matrix. It is believed that this partial spatial separation of fats "decouples" the N-values and the C-values at a particular temperature.

U.S. Pat. No. 4,315,955, discloses how since the 1940's there has been a continued attempt to produce a product which has the advantages of both butter and margarine but the disadvantages of neither product. The prior art method disclosed involves the use of a hydrogenated vegetable oil which is mixed with a milk-like phase to produce a cream. The hydrogenated vegetable oil is dispersed in the aqueous phase by means of steam treatment followed by the application of a partial vacuum. One difficulty with this method is a tendency for the cream to "pre-churn" causing blockage of the plant. Whereas the prior art to this US patent did not make any particular choice of emulsifier, the teaching of the U.S. patent involves the use of a specific combination of emulsifiers to stabilise the cream prior to churning.

In order to increase the butter-likeness of products containing margarine fat U.S. Pat. No. 4,425,370 (Madison) proposes to carefully process a skim-milk /vegetable oil cream to achieve an oil-droplet size range essentially similar to that of dairy cream, before blending the non-dairy cream with dairy-cream and churning the mixture.

Further work on the stability of creams is disclosed in EP 139398 (Nabisco). In that patent, the differences between the structure of butter and the structure of margarine are acknowledged. The proposal made in this art is to form an emulsion of all the fats with an aqueous phase, add an emulsifier and homogenize the emulsion to form a semi-stable cream, which is inverted in a batch churn.

Yet another process is disclosed in GB 2130232. In this specification the homogenizer is used as an alternative to the churn, to bring about phase inversion and form liquid butter which is then mixed with oil in a scraped-surface heat exchanger.

From the above, it can be seen that the art is replete with specifications relating to the preparation of spreads with particular rheological properties by preparing, mixing and churning of creams. On the one hand some of these specifications disclose products and processes relating of margarine-like butters, that is to butters which are spreadable from the refrigerator. On the other hand, some of the specifications relate to butter-like margarines, that is to margarines which have a butter-like plasticity and elasticity. It also follows that although it has become known that the size of the globule population in the product has some effects on the properties of these products, a simple means for manipulating this population has not previously been found.

Moreover, experience has shown that few of the products disclosed in the art simultaneously exhibit a stability, texture and ease of manufacture similar to that of butter, without sacrificing the nutritional qualities of margarine by the incorporation of saturated fats, particularly large proportions of butterfat, or sacrificing the ease of spreading exhibited by margarine taken from cold storage.

We have now determined how a spread may be made which is butter-like at room temperature and which does not exhibit the hardness of butter in the refrigerator. This product can be comprised of nothing other than butter, can comprise a blend of butterfat with other substances or may comprise little or no butterfat. In the preparation of the product the "N" and "C" values are partially decoupled from each other such that they may be independently manipulated to give the desired product properties.

Surprisingly, a process for the production of spreads according to the present invention can be carried out on existing dairy plant with only minor modification. The process is equally applicable to margarine and other spread production, and again, requires only minor modification of existing plants. In either case, the process need have no effect on the chemical composition of the products obtained.

According to a first aspect of the present invention there is provided a process for the preparation of a spread by churning of a cream, characterised in that, the cream is formed by admixture of two creams at differing temperatures shortly before churning.

In the context of the present invention the short time between mixing and churning is considered crucial.

Typically, the two creams at differing temperature have identical compositions.

By employing otherwise identical creams at different temperatures it is possible to ensure that the creams differ in stability, and thereby believed possible to control the churning process without substantial alteration of any bulk property of the materials.

In a preferred embodiment of the present invention a single cream stream is split into two streams which are brought to differing temperatures and recombined. At first inspection, this might appear to be rather pointless process, as it is a well-established principle of thermodynamics that when two bodies at differing temperatures are brought into contact, heat will flow from the warmer to the cooler so as to equalise the temperature. However, equilibration of temperature is not instantaneous and where the solids content of the bodies changes with temperature a finite time is required for the phase change.

Such "split-stream" heating may also be accomplished by local heating of a portion of the cream in the churn input stream, rather than by separating the stream into two streams.

Without wishing to impose any constraint upon the scope of the present invention, we believe that the recombined but not yet equilibrated cream contains globules with differing solids contents but similar chemical compositions. As churning takes place before equilibration of temperature and solids levels has been completed, certain of the globules are believed to be less stable than others and are rapidly damaged in the churning process, releasing liquid oil. The presence of this liquid oil is believed to promotes rapid "break" of the churn contents, and lead to the formation of a product with an enhanced surviving globule population.

Preferably the temperature difference between the two streams is in the range of from around 40 to around 5 degrees centigrade. As the mixing ratio changes to favour a greater proportion of the warmer of the two streams, the temperature difference must be reduced in order to produce a mixed cream which is of a mean temperature suitable for churning.

For convenience, a nascent cream in which temperature equilibration has not been completed will be referred to herein as a non-equilibrated cream.

Accordingly a second aspect of the present invention provides a non-equilibrated cream as defined herein.

The invention is not limited to those processes and to that cream in which two cream streams differing only in temperature are brought together. It is envisaged that the invention is equally applicable where the cream streams differ in composition. TABLE ONE below sets out the possible compositions of the two cream streams from which the non-equilibrated cream may be formed.

|  | Warmer Cream | Cooler Cream |
| --- | --- | --- |
| Dairy Cream | Ripened Cream | Ripened Cream |
|  | Unripened Cream | Unripened Cream |
| Non-dairy cream: | Aqueous Phase: | |
|  | Buttermilk | Buttermilk |
|  | Skim-milk | Skim-milk |
|  | Fat Phase: | |
|  | Butter-fat | Butter-fat |
|  | Vegetable-oil | Vegetable-oil |
|  | Tallow | Tallow |
|  | Fish oil | Fish oil |

Combinations in which the warmer of the two creams is ripened dairy cream and the cooler of the two creams is a ripened or non-ripened non-dairy cream are particularly preferred.

According to a third aspect of the present invention there is provided a spread preparable by the method of the present invention. Such products exhibit a relatively flat C-line over the temperature range bounded by table and refrigerator temperatures.

Where the product is chemically identical to butter, that is, where the cream streams combined prior to churning both consist of dairy cream, a product is obtained which is relatively spreadable at refrigerator temperatures, but which is chemically identical to butter. Such a product can be legally described as butter. In such embodiments of the invention is is preffered that a small quantity of high temperature dairy cream should be injected. Injection of around 5% of cream at a temperature difference of around 40° C. give good results.

However it is believed that as little as 1% injection would give noticable product differences if the injection temperature were high enough.

Where the product comprises a mixture of dairy and non-dairy fats originally present in two separate creams it is preferred that the dairy cream stream should be the warmer of the two upon mixing. More preferably, the ratio of warm to cool cream should be in the range 20:80 to 40:60, and the temperature difference correspondingly be reduced to 5–15 degrees Centigrade.

This two embodiments of the present invention have the common feature that the warmer and cooler cream streams are mixed at different temperatures just prior to churning. Preferably, the time difference between combination of the creams and the application of shear should be of the order of seconds and most preferably lies in the range 1.0 and zero seconds.

According to a fifth aspect of the present invention there is provided a churning plant comprising a churn, and means for supplying to the churn non-equilibrated cream as defined herein.

Typically, means for supplying non-equilibrated cream comprise a heat exchanger, a cream supply line to deliver cream to said heat exchanger, a cream discharge line and a bypass line communicating with both the supply line and the discharge line. In known churning processes it is common to deliver cream to the churn via a heat exchanger. As will be illustrated below, the present invention can be put into effect by means of a single bypass line plumbed around this heat exchanger. The discharge line communicates with the input of the churn and the distance from the confluence of the bypass pipe and the inlet of the churn should be as short as possible.

A secondary benefit of the present invention is that in certain embodiments the heat exchanger need not have the capacity of that in the prior process, as the throughput of the heat-exchanger is reduced.

It has also been noted that the energy input required for the overall churning process can be reduced by the method of the present invention. Such energy savings can be considerable on large scale.

As a further alternative it is envisged that the two creams can be injected directly into the buttermaker. This would give an equilibration time of the order of zero seconds.

The present invention will be further described by way of illustrative examples of the embodiment of the invention at an industrial scale and with reference to the accompanying drawings wherein;

EXAMPLE 1

Figure 1:
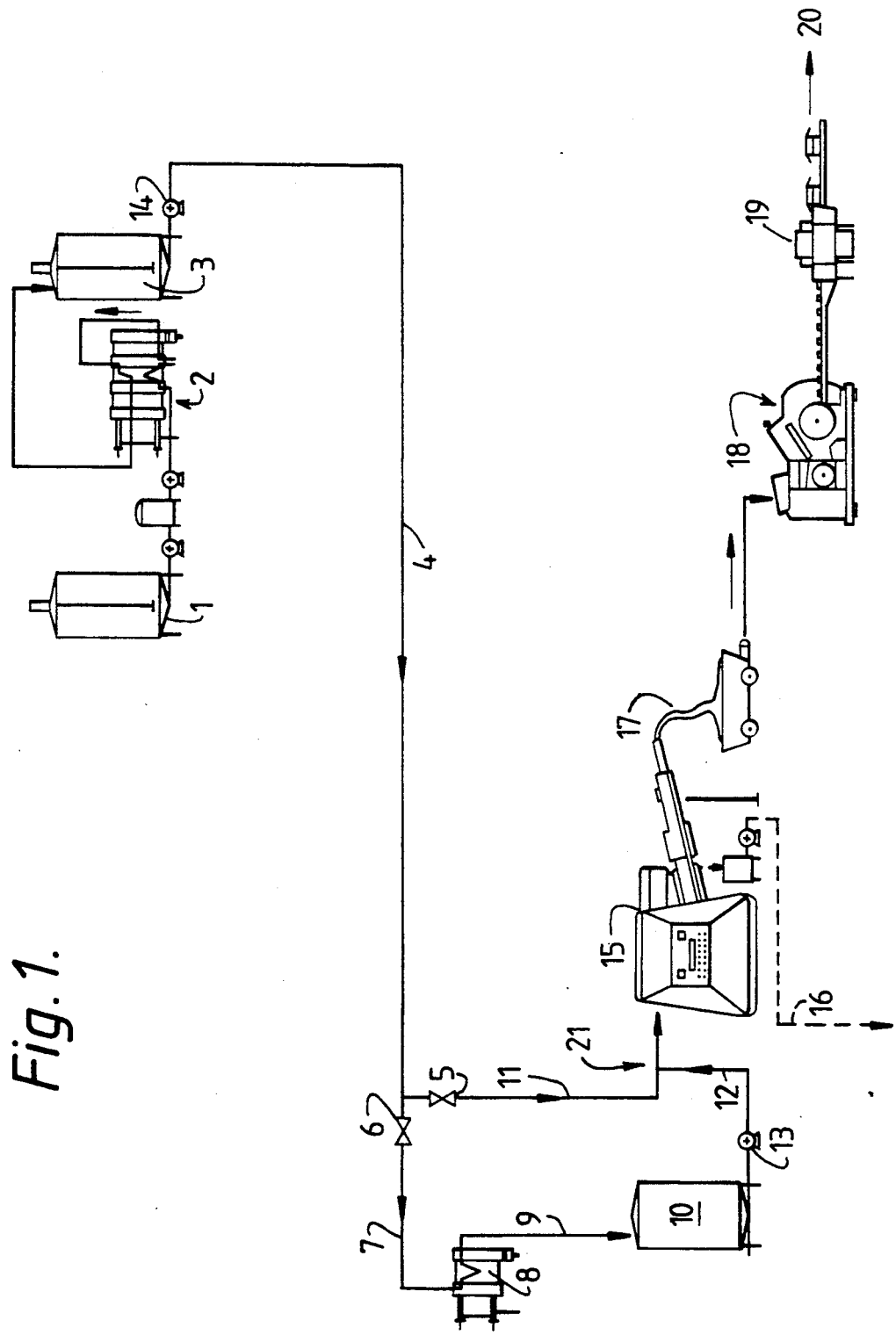
FIG. 1 shows, in schematic form, a plant for the performance of one embodiment of the present invention, in which a single cream is split and recombined and, FIG. 2 shows, in schematic form, a plant for the performance of a further embodiment of the present invention, in which two dissimilar creams are combined.

Turning to FIG. 1 there is shown, in schematic form, a conventional plant for the preparation of cream, modified according to one aspect of the present invention.

The initial stages of the process line are quite conventional and comprise intermediate storage tank (1) to receive and contain fresh dairy cream, Pasteurizer (2) to heat the cream to a suitable temperature for Pasteurization and cool the cream before delivery to a ripening tank (3).

It is known to subject the cream in the ripening tank (3) to a program of heat treatment so as to give the fat the required crystalline structure when it solidifies on cooling. This program is selected having regard to such factors as the composition of the fat, expressed for example in terms of the iodine value. An example of such a process is the so-called "ALNARP" process. As a general rule ripening takes 12–15 hours. In an embodiment of the present invention the cream reaches a final temperature in the ripening tank of 10.7° C.

Ripened cream is drawn from the ripening tank (3) by means of pump (14) and urged along line (4). At this stage in the process, valve (5) is closed and valve (6) is open. Cream therefore passes along line (7) and into line (9) via heat-exchanger (8). During passage through the heat exchanger (8) the cream is heated to a temperature of 50° C. at which temperature it is stored in water-jacketed, temperature controlled tank (10).

When 3% of the cream has passed into tank (10), valve (6) is closed and valve (5) opened. Simultaneously, pump (13) is activated, urging heated cream at a temperature of 50° C. along line (12) to the churn (15). Pump (14) now urges ripened cream at a temperature of 10.7° C. along line (4) and via line (11) to the churn (15). Combination of the creams from lines (11) and (12) occurs at the location indicated by the numeral (21), to form the non-equilibrated cream shortly before the creams enter the churn (15).

A Simon-Frere continuous buttermaker was employed as churn (15). Other types of continuous buttermakers can be employed as alternatives. The distance between the confluence of the warmer and cooler streams, and the inlet of the beater of the buttermaker was around 20 cm. Taking the flow rate into consideration the time between the onset of mixing and the application of high shear in the buttermaker was estimated as less than half a second.

The relative volumes per unit time of creams arriving at the confluence (21) were cool:heated cream; 3:97%. Simple calculation shows that the temperature of the combined stream would have been;

$$[(97/100)*(273+10.7)]+[(3/100)*(273+50)]-273 = 11.8° C.$$

following equilibration and disregarding any latent heat effects such as partial crystallization of the warmer cream upon cooling. This temperature is within the range at which dairy cream would normally be churned.

In the method of the present invention, equilibration of temperature does not occur between the confluence at (21) and the churn (15). Although the Reynolds number associated with the flow from location (21) to the churn (15) can be some such number that turbulent flow occurs, care should be taken that the flow conditions are such that equilibration is minimised: mostly laminar flow in this region is preferred however some slight mixing, such as by the use of a short static mixer is alowable.

Churning follows as is known in butter-making with the separation of buttermilk which is discharged from the churn (15) along line (16). Product is recovered in tubs at (17) and conveyed to packaging apparatus (18) and cartoning apparatus (19). The packed product being delivered at location (20). Upon operation of the process it was noted that the energy input required for churning fell.

It will be noted that the churning plant for performance of the present invention can be constructed by simple modification of existing plant to ensure that such plant includes means for supplying non-equilibrated cream to the churn (15). These means comprise heat exchanger (8), cream supply line (7) to deliver cream to said heat exchanger, cream discharge line (9/12) and bypass line (11) communicating with both the supply line (7) and discharge line (9/12).

It is commonplace for a heat exchanger to be present in the relevant part of a butter-making plant, although this is normally used for warming the cream to the the churning temperature. Bearing in mind the apparatus already present at this stage of the butter-making process, it is envisaged that the only substantive addition required for the present invention is bypass line (11), a few feet of pipe. Tank (10) may be omitted in continuous operation.

As a control experiment the process was operated without cream injection at location (21) and with normal churning conditions.

The C-value of the product prepared according to the present invention was measured and compared with the butter produced in the comparative experiment. Obviously the composition of these two products was identical in the chemical sense, and the products will consequently have identical N-values at a given temperature. However, it was observed that the product of the invention was softer at the same measuring temperature. For the 3% cream injection described above a 6% reduction in C-value was noted.

Various other experiments were performed to vary the injection ratio in the range 5-30% by weight. The temperature difference was varied from 40°-10° C. The best results were obtained when the product of the temperature difference and the weight % injection lay in the range 200-300 wt. % °C. The limits being eventually determined by the browning point of the hot cream at which temperature protein begins to be denatured and the equilibration time when creams of very similar temperature are mixed.

EXAMPLE 2

In example 1 both cream streams had the same formulation. In this example the cream streams have differing formulations and are prepared separately.

Figure 2:
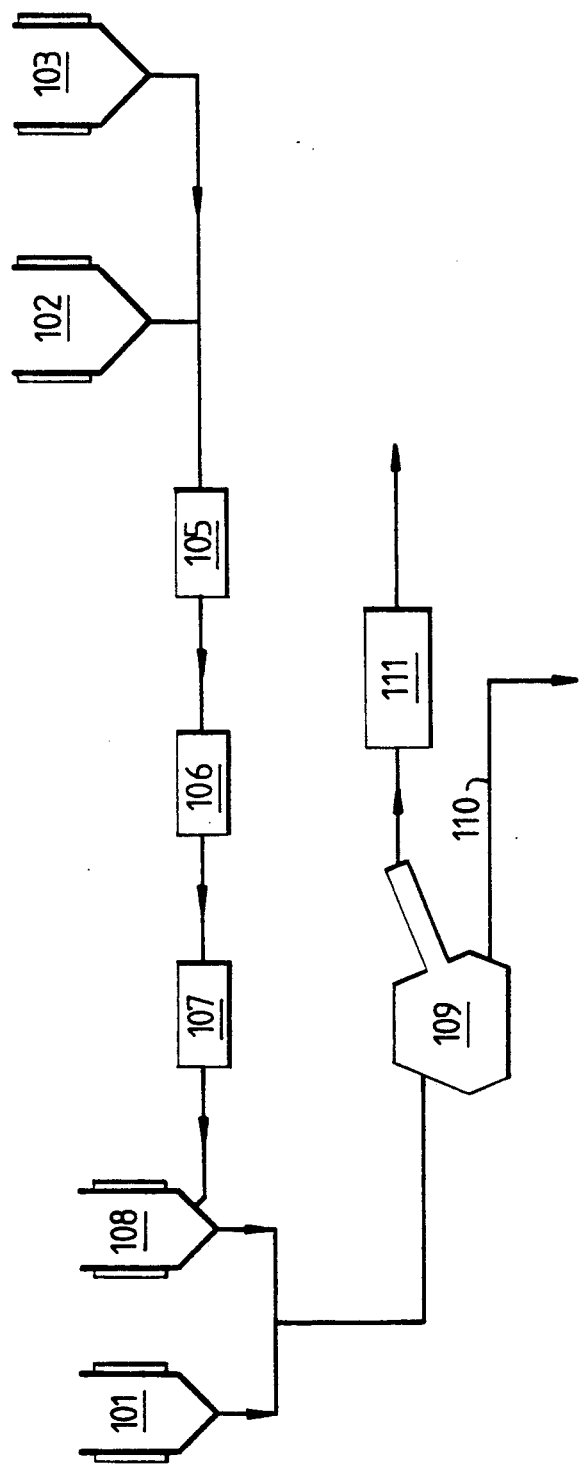

Turning to FIG. 2 there is shown in schematic form a plant for the performance of example 2.

Pasteurised dairy cream containing 38% fat is stored at 5° C. in a water-jacketed tank (101) overnight to ripen the cream.

Separately, a non dairy cream is prepared with the following formulation, all values being given in wt. %:
Fat blend: 38%
Monoglyceride: 00.2% on fat
Lecithin: 00.2% on fat
Colour: 5.5 ppm
Sweet Buttermilk: 61.13%
Salt: 00.87%

The fat phase was a mixture of rapeseed oil and palm oil as is known in the margarine industry.

The ingredients are stored in water jacketed fat phase and water-phase tanks (102) and (103) until required, were pumped along lines (104) to a static mixer (105) and through a homogeniser valve (106) at a pressure drop of 5 Atm. The homogenised cream was Pasteurised in heat exchanger (107) and cooled to a storage temperature of 5° C. in tank (108).

This non dairy cream was ripened overnight at 5° C.

The churning step was carried out after the dairy cream had been carefully warmed to a temperature of 14° C. in a plate heat exchanger with minimised temperature difference between the process and service streams, and mixed with the non-dairy cream at 5° C. immediately prior to churning in churn (109). The mixing ratio was 70 parts of non-dairy cream to 30 parts of dairy cream. Care was taken that the mixed cream did not equilibrate before entering the churn. The product was recovered from the churn and packed in a conventional way using packaging equipment (111), and the buttermilk run off along line (110).

When presented to an panel of experts for tasting, the product was well received. As a comparative (control) example, identical samples of dairy cream and the non-dairy cream to those used in example 2 were mixed in the same ratio and allowed to equilibrate before churning for a period of at least three hours. This mixed and equilibrated cream was then churned under substantially the same conditions as the non-equilibrated cream. These control products were of the same overall composition but of a lower quality than those prepared according to the present invention. In particular the penetration of the butter flavour and the texture of the product were much improved in the example according to the invention. In addition, a detailed comparative trial indicated that the toughness, the overall butterlikeness and the air incorporation or "bubbles" value were much improved by application of the present method. The mechanical butterlikeness score of the products according to the invention was 90% of that obtained for butter, whereas identical compositions made by the control method scored only 66% compared to butter in an identical blind test.

Without wishing to limit the invention, it is considered that this improvement was due to an increased proportion of the butterfat (30% in this example) components being present in the continuous fat phase of the product whereas the vegetable fat components (70% of the fat phase) were partially segregated into globules of fatty material present in that continuous fat phase. Taste results confirm this, as the 30% butterfat products the present invention had a butter taste intermediate between the 30% butterfat control and pure butter; whereas the product scored around a half for flavour impact: the control scored around a quarter for flavour impact compared to 100% butter.

It was also noted that the churning process was greatly facilitated by the hot or warm cream injection, particularly in that maintaining continuous inversion and a good release of buttermilk was easier with the process of the present invention. This is particularly important for those products which comprise moderate to large amounts of non-dairy fat as these products may otherwise be difficult to churn.

Various modifications may be made without departing from the scope and spirit of the present invention. For example, the hot, injected cream need not have been ripened, as the solid structure formed by such a process will be destroyed upon heating. Furthermore the plant can include process monitoring equipment and apparatus for cleaning in place, all of which have been omitted from the diagrams for the sake of clarity.

We claim:

1. A process for the preparation of a spread by churning of an oil-in-water emulsion cream, wherein the cream is formed by admixture of two creams at differing temperatures and churned without further maturing.

2. A process according to claim 1 wherein the two creams at differing temperature have identical compositions.

3. A process according to claim 1 or 2 wherein a single cream stream is split into two streams which are brought to differing temperatures and recombined.

4. A process according to claim 1, wherein the creams are both dairy cream.

5. A process according to claim 1 wherein one of the creams is dairy cream and the other is a non-dairy cream.

6. A process according to claim 1 wherein the temperature difference lies in the range 5°–40° C.

7. A process according to claim 1 wherein the mixing ratio of the warmer to the cooler cream lies in the range 1:99 to 30:70.

8. A spread preparable by the method of claim 1.

* * * * *